(12) United States Patent
Suzuki (10) Patent No.: US 8,526,599 B2
(45) Date of Patent: Sep. 3, 2013

(54) INPUT/OUTPUT APPARATUS AND COMMUNICATION TERMINAL

(71) Applicant: Panasonic Corporation, Osaka (JP)

(72) Inventor: Ryoji Suzuki, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/622,027

(22) Filed: Sep. 18, 2012

(65) Prior Publication Data

US 2013/0077777 A1      Mar. 28, 2013

(30) Foreign Application Priority Data

Sep. 22, 2011      (JP) .................................. 2011-206917

(51) Int. Cl.
*H04B 3/23*      (2006.01)

(52) U.S. Cl.
USPC ................... 379/406.08; 379/406.05

(58) Field of Classification Search
USPC ........... 379/406.01–406.16, 3; 370/286–291; 381/71.11–71.14; 455/570
See application file for complete search history.

(56) References Cited

U.S. PATENT DOCUMENTS

| 4,414,432 A * | 11/1983 | Skerlos et al. ................. 348/552 |
| 2007/0092074 A1* | 4/2007 | Takada ...................... 379/406.08 |
| 2010/0246804 A1* | 9/2010 | Prakash et al. ........... 379/406.05 |

FOREIGN PATENT DOCUMENTS

| JP | 1-158860 | 6/1989 |
| JP | 2-288428 | 11/1990 |
| JP | 5-48547 | 2/1993 |
| JP | 2000-252883 | 9/2000 |
| JP | 2004-282539 | 10/2004 |

\* cited by examiner

*Primary Examiner* — Md S Elahee
*Assistant Examiner* — Akelaw Teshale
(74) *Attorney, Agent, or Firm* — Wenderoth, Lind & Ponack, L.L.P.

(57) ABSTRACT

An input/output apparatus includes a speaker, a microphone, an adaptive filter circuit and a control circuit. The speaker is configured to output audio based on a voice-receiving signal. The microphone is configured to produce a voice-transmitting signal based on gathered audio. The adaptive filter circuit is configured to produce a residual signal based on a pseudo echo signal and a amplified voice-transmitting signal. The pseudo echo signal is produced from the voice-receiving signal and a transfer coefficient which expresses audio transfer properties between the speaker and the microphone. The amplified voice-transmitting signal is produced by causing a microphone amplification circuit to amplify the voice-transmitting signal. The control circuit is configured to stop output of the residual signal from the adaptive filter circuit during at least one of the speaker and the microphone is muted.

7 Claims, 5 Drawing Sheets

INPUT/OUTPUT APPARATUS AND COMMUNICATION TERMINAL

This application claims priority under 35 U.S.C. §119 to Japanese Patent Application No. 2011-206917, filed on Sep. 22, 2011. The entire disclosure of Japanese Patent Application No. 2011-206917 is hereby incorporated herein by reference.

BACKGROUND OF THE INVENTION

1. Field of the Invention

The technique disclosed herein relates to an input/output apparatus comprising a speaker and a microphone.

2. Description of the Related Art

A method for stopping a coefficient series in an adaptive filter circuit from being updated has been recently proposed in order to inhibit the occurrence of an echo and/or howling created by a situation in which a voice-receiving signal outputted from a speaker picks up sound in a microphone when double-talk occurs in a teleconferencing system (for example, in Japanese Laid-Open Patent Publication No. 5-48547).

According to the method in Japanese Laid-Open Patent Publication No. 5-48547, changing of a learned coefficient series can be avoided in cases in which the echo path has been changed by the muting of the speaker and/or the microphone.

SUMMARY OF THE INVENTION

However, in Japanese Laid-Open Patent Publication No. 5-48547, there remains a path for deducting the pseudo echo signal, which is produced by a convolution operation with the voice-receiving signal series and the coefficient series, from the voice-receiving signal and outputting the signal even when the coefficient series update in the adaptive filter circuit is stopped. Accordingly, an echo and/or howling is liable to occur due to the fact that the pseudo echo signal is transmitted to a counterpart.

An object of the technique disclosed herein is to provide an input/output apparatus capable of suppressing the occurrence of an echo and/or howling.

An input/output apparatus includes a speaker, a microphone, an adaptive filter circuit and a control circuit. The speaker is configured to output audio based on a voice-receiving signal. The microphone is configured to produce a voice-transmitting signal based on gathered audio. The adaptive filter circuit is configured to produce a residual signal based on a pseudo echo signal and a amplified voice-transmitting signal. The pseudo echo signal is produced from the voice-receiving signal and a transfer coefficient which expresses audio transfer properties between the speaker and the microphone. The amplified voice-transmitting signal is produced by causing a microphone amplification circuit to amplify the voice-transmitting signal. The control circuit is configured to stop output of the residual signal from the adaptive filter circuit during at least one of the speaker and the microphone is muted.

According to the technique disclosed herein, it is possible to provide an input/output apparatus capable of suppressing the occurrence of an echo and/or howling.

DETAILED DESCRIPTION OF THE INVENTION

1. First Embodiment (Configuration Of Input/Output Apparatus 1)

Figure 1:
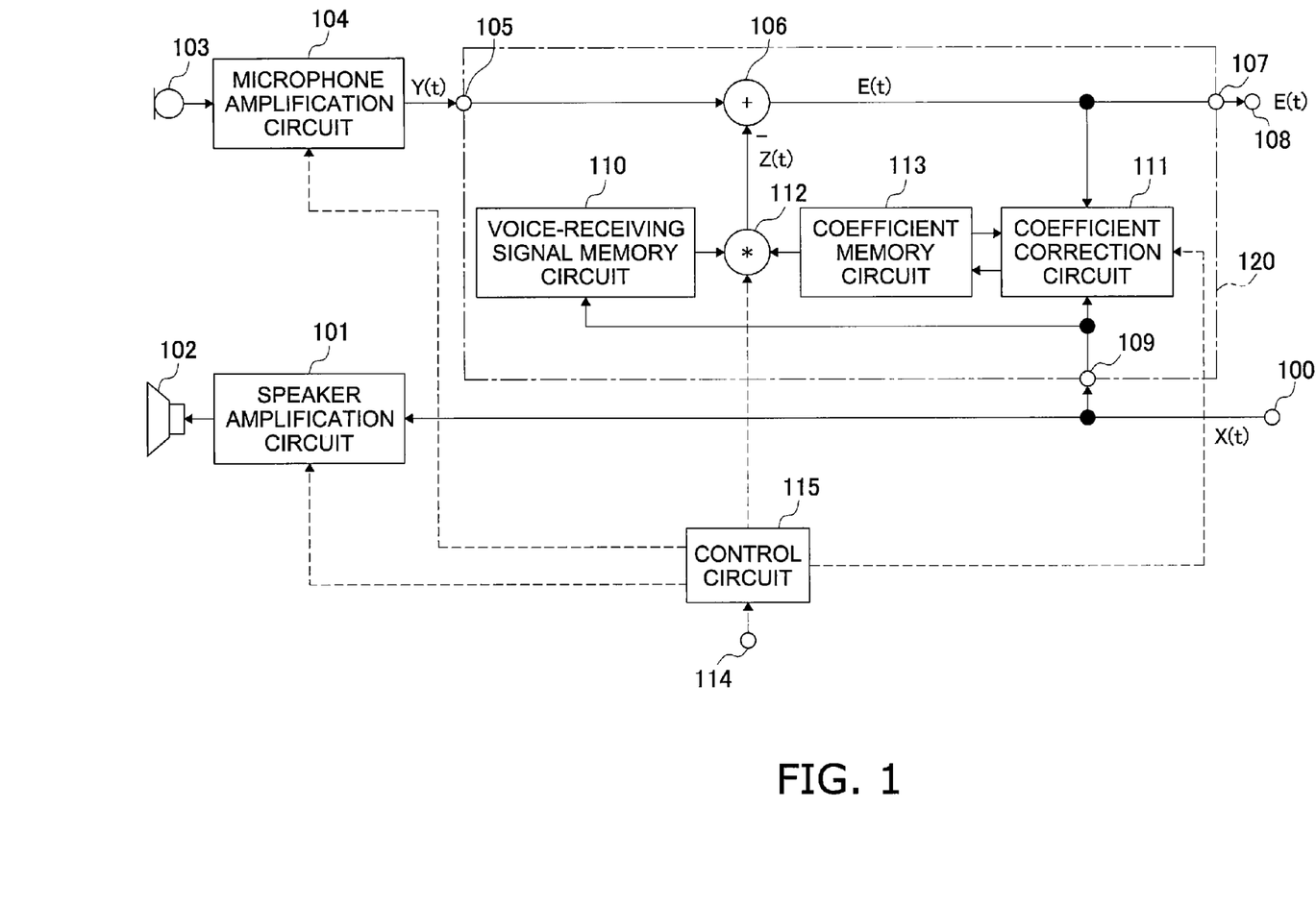
FIG. 1 is a block diagram of the input/output apparatus according to a first embodiment.

FIG. 1 is a block diagram of an input/output apparatus 1 according to a first embodiment. The input/output apparatus 1 comprises a speaker and a microphone, and is suitable for use in a communication terminal capable of bi-directionally exchanging audio signals with a counterpart terminal Such a communication terminal may comprise a receiver for receiving a voice-receiving signal X(t) from the counterpart terminal, and a transmitter for transmitting, to the counterpart terminal, a voice-transmitting signal Y(t) outputted from the input/output apparatus 1, although neither are shown in the drawings.

The input/output apparatus 1 comprises an input terminal 100, a speaker amplification circuit 101, a speaker 102, a microphone 103, a microphone amplification circuit 104, an adaptive filter circuit 120, an output terminal 108, a mute signal input part 114, and a control circuit 115.

The voice-receiving signal X(t) is inputted to the input terminal 100. The voice-receiving signal X(t) is then outputted from the input terminal 100 to the speaker amplification circuit 101 and the adaptive filter circuit 120, respectively.

The speaker amplification circuit 101 amplifies the voice-receiving signal X(t) outputted from the input terminal 100. The speaker amplification circuit 101 outputs the amplified voice-receiving signal X(t) to the speaker 102. However, the speaker amplification circuit 101 stops amplification and output of the voice-receiving signal X(t) in cases in which a stop signal has been inputted from the control circuit 115. Input of the voice-receiving signal X(t) to the speaker 102 is thereby stopped while the speaker 102 is muted.

The speaker 102 is connected to the speaker amplification circuit 101. The speaker 102 outputs audio based on the voice-receiving signal X(t) amplified by the speaker amplification circuit 101.

The microphone 103 produces the voice-transmitting signal Y(t) based on the audio gathered from the surrounding area. The microphone 103 outputs the voice-transmitting signal Y(t) to the microphone amplification circuit 104.

The microphone amplification circuit 104 amplifies the voice-transmitting signal Y(t) inputted from the microphone 103. The microphone amplification circuit 104 outputs the amplified voice-transmitting signal Y(t) to the adaptive filter circuit 120. However, the microphone amplification circuit 104 stops production and output of the voice-transmitting signal Y(t) in cases in which a stop signal has been inputted from the control circuit 115. Input of the voice-transmitting signal Y(t) to the adaptive filter circuit 120 is thereby stopped while the microphone 103 is muted.

The voice-receiving signal X(t) outputted from the input terminal 100 and the voice-transmitting signal Y(t) outputted from the microphone amplification circuit 104 are inputted to the adaptive filter circuit 120. The adaptive filter circuit 120 has a function for removing, from the voice-transmitting signal Y(t), audio components outputted from the speaker 102 and gathered by the microphone 103. The occurrence of an echo and/or howling in the voice-transmitting signal Y(t) is thereby suppressed.

The adaptive filter circuit 120 comprises a voice-receiving signal input terminal 109, a voice-receiving signal memory circuit 110, a coefficient memory circuit 113, a product-summing circuit 112, a voice-transmitting signal input terminal 105, a subtraction circuit 106, a coefficient correction circuit 111, and a voice-transmitting signal output terminal 107.

The voice-receiving signal X(t) outputted from the input terminal 100 is inputted to the voice-receiving signal input terminal 109. The voice-receiving signal input terminal 109 outputs the voice-receiving signal X(t) to the voice-receiving signal memory circuit 110 and the coefficient correction circuit 111.

The voice-receiving signal memory circuit 110 stores the voice-receiving signal X(t) inputted from the voice-receiving input terminal 109.

The coefficient memory circuit 113 stores the transfer coefficient expressing the audio transfer properties in a space between the speaker 102 and the microphone 103. The transfer coefficient stored in the coefficient memory circuit 113 is updated by the coefficient correction circuit 111.

The product-summing circuit 112 produces a pseudo echo signal Z(t) by performing a convolution operation with the voice-receiving signal X(t) saved in the voice-receiving signal memory circuit 110 and the transfer coefficient saved in the coefficient memory circuit 113. The product-summing circuit 112 outputs the produced pseudo echo signal Z(t) to the subtraction circuit 106. However, the product-summing circuit 112 stops production of the pseudo echo signal Z(t) in accordance with a control signal outputted from the control circuit 115. Input of the pseudo echo signal Z(t) to the subtraction circuit 106 is thereby stopped in cases in which the speaker 102 and/or the microphone 103 are muted.

The voice-transmitting signal Y(t) outputted from the microphone amplification circuit 104 is inputted to the voice-transmitting signal input terminal 105. The voice-transmitting signal input terminal 105 outputs the voice-transmitting signal Y(t) to the subtraction circuit 106.

The subtraction circuit 106 produces a residual signal E(t) by deducting the pseudo echo signal Z(t) from the voice-transmitting signal Y(t). Audio components outputted from the speaker 102 and gathered by the microphone 103 are thereby removed from the voice-transmitting signal Y(t). The subtraction circuit 106 outputs the residual signal E(t) to the coefficient correction circuit 111 and the voice-transmitting signal output terminal 107, respectively.

However, input of the voice-transmitting signal Y(t) to the adaptive filter circuit 120 from the microphone amplification circuit 104 is stopped in cases in which the microphone 103 is muted, as described above. In addition, input of the pseudo echo signal Z(t) to the subtraction circuit 106 from the product-summing circuit 112 is stopped while the microphone 103 is muted. Accordingly, the voice-transmitting signal Y(t) and the pseudo echo signal Z(t) are not inputted to the subtraction circuit 106 while the microphone 103 is muted, and no signal is therefore outputted from the subtraction circuit 106.

In addition, input of the pseudo echo signal Z(t) to the subtraction circuit 106 from the product-summing circuit 112 is stopped in cases in which the speaker 102 is muted, as described above. On the other hand, the voice-transmitting signal Y(t) is inputted to the subtraction circuit 106 when the microphone 103 is not muted. Accordingly, the subtraction circuit 106 outputs the voice-receiving signal Y(t) unchanged as the residual signal E(t) while only the speaker 102 is muted.

Output, from the adaptive filter circuit 120, of the residual signal E(t) produced based on the pseudo echo signal Z(t) and the voice-transmitting signal Y(t) is thus stopped in cases in which either the speaker 102 or the microphone 103 is muted.

The coefficient correction circuit 111 computes the update value of the transfer coefficient between the speaker 102 and the microphone 103 based on the residual signal E(t) so that the output of the subtraction circuit 106 is minimized The coefficient correction circuit 111 stores the update value of the transfer coefficient in the coefficient memory circuit 113. The occurrence of an echo and/or howling in the voice-transmitting signal Y(t) is thereby suppressed even in cases in which the transfer coefficient between the speaker 102 and the microphone 103 changes. However, the coefficient correction circuit 111 stops computation of the update value of the transfer coefficient in accordance with a stop signal outputted from the control circuit 115. In this case, the coefficient correction circuit 111 does not store the update value of the transfer coefficient in the coefficient memory circuit 113.

The voice-transmitting signal output terminal 107 outputs the voice-transmitting signal Y(t) and/or the residual signal E(t) produced from the voice-transmitting signal Y(t) using the adaptive filter circuit 120.

The residual signal E(t) and/or the voice-transmitting signal Y(t) outputted from the adaptive filter circuit 120 is inputted to the output terminal 108. The output terminal 108 outputs the residual signal E(t) and/or the voice-transmitting signal Y(t) to external equipment or the like.

A speaker mute signal expressing an operation for muting the speaker 102 is inputted to the mute signal input part 114. The speaker mute signal is produced by the depression of a speaker mute button on a remote control (not shown) in cases in which a user desires to temporarily stop the output of audio from the speaker 102. In addition, a microphone mute signal expressing an operation for muting the microphone 103 is inputted to the mute signal input part 114. The microphone mute signal is produced by the depression of a microphone mute button on the remote control in cases in which the user desires to temporarily stop the gathering of audio using the microphone 103.

The speaker mute signal and/or the microphone mute signal is outputted from the mute signal input part 114 to the control circuit 115. The control circuit 115 outputs to the speaker amplification circuit 101 a stop signal for stopping the speaker amplification circuit 101 in accordance with the speaker mute signal. The speaker 102 is thereby muted. The control circuit 115 outputs to the microphone amplification circuit 104 a stop signal for stopping the microphone amplification circuit 104 in accordance with the microphone mute signal. The microphone 103 is thereby muted. In addition, the control circuit 115 outputs to the coefficient correction circuit 111 a control signal for stopping the update value operation for the coefficient series in the coefficient correction circuit 111 during the mute period of the speaker 102 and/or the microphone 103. Furthermore, the control circuit 115 outputs to the product-summing circuit 112 a control signal for stopping the convolution operation in the product-summing circuit 112 during the mute period of the speaker 102 and/or the microphone 103.

(Operation and Effect)

(1) In the input/output apparatus 1 according to the first embodiment, the adaptive filter circuit 120 stops output of the residual signal E(t) produced based on the pseudo echo signal Z(t) and the voice-transmitting signal Y(t) in cases in which either the speaker 102 or the microphone 103 is muted. Specifically, the control circuit 115 also stops the convolution operation in the product-summing circuit 112 in cases in which the speaker amplification circuit 101 and/or the microphone amplification circuit 104 has been stopped.

Accordingly, a path formed by the product-summing circuit 112 and the subtraction circuit 106 is blocked in cases in which an echo path has been blocked by the stoppage of the speaker amplification circuit 101 and/or the microphone amplification circuit 104. Deduction of the pseudo echo signal Z(t) from the voice-transmitting signal Y(t) can therefore be suppressed despite the fact that the speaker 102 is muted, and production of a reverse-sign pseudo echo signal Z(t) can also be suppressed despite the fact that the microphone 103 is muted. As a result, the occurrence of an echo and/or howling can be suppressed.

(2) In the input/output apparatus 1 according to the first embodiment, the control circuit 115 also stops updating of the coefficient series in the coefficient correction circuit 111 in cases in which the speaker amplification circuit 101 and/or the microphone amplification circuit 104 has been stopped.

Accordingly, updating of the transfer coefficient can be suppressed based on the voice-transmitting signal Y(t) in cases in which audio components outputted from the speaker 102 are not included in the voice-transmitting signal Y(t) by, for example, muting only the speaker 102. A proper pseudo echo signal Z(t) based on a learned transfer coefficient can therefore be produced when muting of the speaker 102 has been cancelled. As a result, an echo and/or howling can be quickly suppressed after cancellation of muting.

2. Second Embodiment (Configuration Of Input/Output Apparatus 1)

Figure 2:
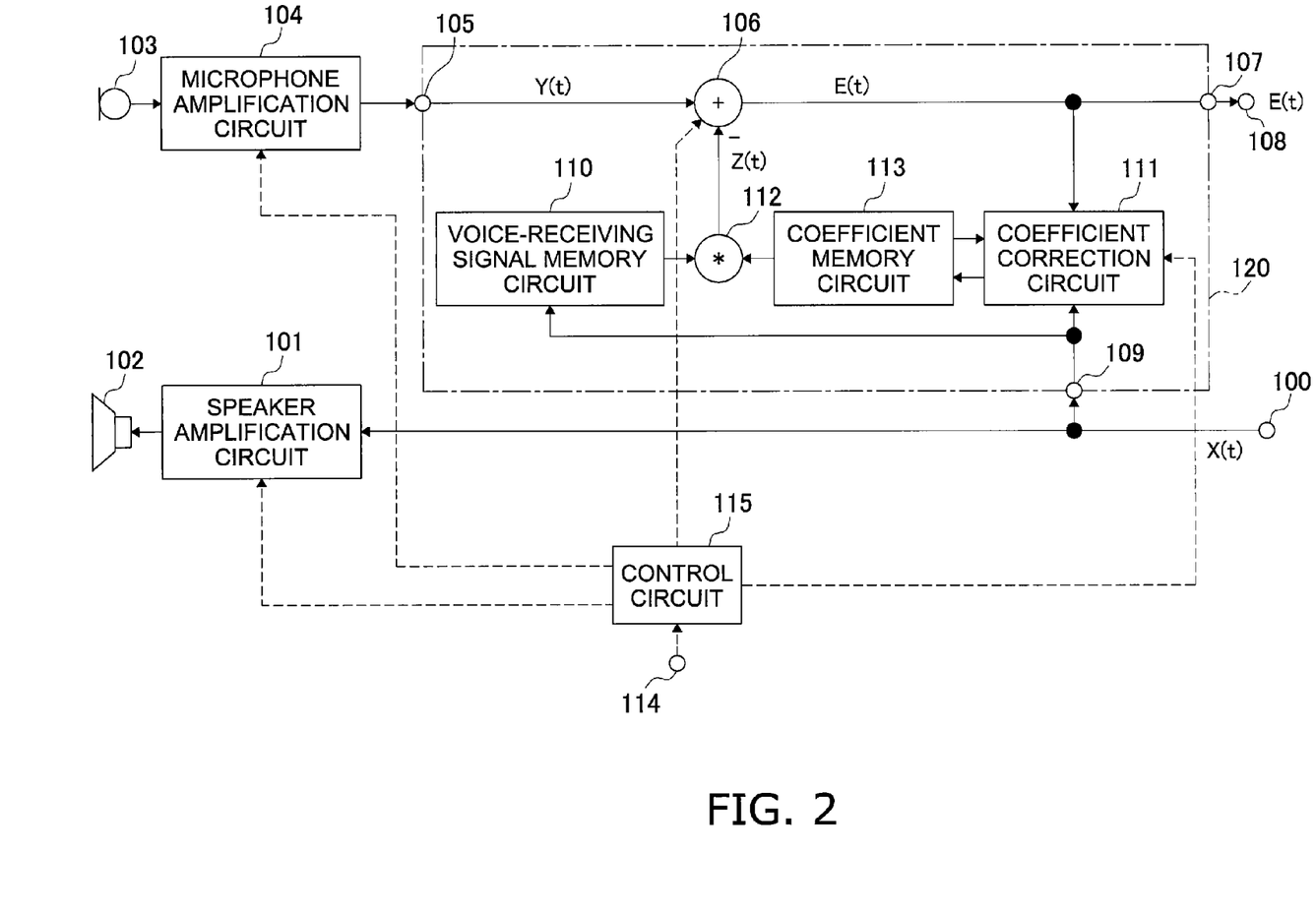
FIG. 2 is a block diagram of the input/output apparatus according to a second embodiment.

FIG. 2 is a block diagram of the input/output apparatus 1 according to a second embodiment. The difference between the first embodiment and the second embodiment is that the control circuit 115 stops the process in the subtraction circuit 106 rather than stopping the convolution operation in the product-summing circuit 112. This difference will be mainly described below.

The control circuit 115 stops the process in which the pseudo echo signal Z(t) is deducted from the voice-transmitting signal Y(t) in the subtraction circuit 106 in cases in which the speaker mute signal and/or the microphone mute signal is inputted from the mute signal input part 114. The subtraction circuit 106 thereby allows the voice-transmitting signal Y(t) to pass through unchanged as a residual signal E(t) in cases in which the voice-transmitting signal Y(t) is inputted from the voice-transmitting signal input terminal 105, and outputs no signal in cases in which the voice-transmitting signal Y(t) is not inputted from the voice-transmitting signal input terminal 105.

(Operation and Effect)

(1) In the input/output apparatus 1 according to the second embodiment, the adaptive filter circuit 120 stops output of the residual signal E(t) produced based on the pseudo echo signal Z(t) and the voice-transmitting signal Y(t) in cases in which either the speaker 102 or the microphone 103 is muted. Specifically, the control circuit 115 stops the process in which the pseudo echo signal Z(t) is deducted from the voice-transmitting signal Y(t) in the subtraction circuit 106 in cases in which the speaker amplification circuit 101 and/or the microphone amplification circuit 104 has been stopped.

Accordingly, deduction of the pseudo echo signal Z(t) from the voice-transmitting signal Y(t) can be suppressed despite the fact that the speaker 102 is muted, and production of a reverse-sign pseudo echo signal Z(t) can also be suppressed despite the fact that the microphone 103 is muted, in the same manner as in the first embodiment. As a result, the occurrence of an echo and/or howling can be suppressed.

(2) In addition, an echo and/or howling can be quickly suppressed after cancellation of muting by stopping the updating of the coefficient series in the coefficient correction circuit 111 using the control circuit 115 in the same manner as in the first embodiment.

3. Third Embodiment (Configuration Of Input/Output Apparatus 1)

Figure 3:
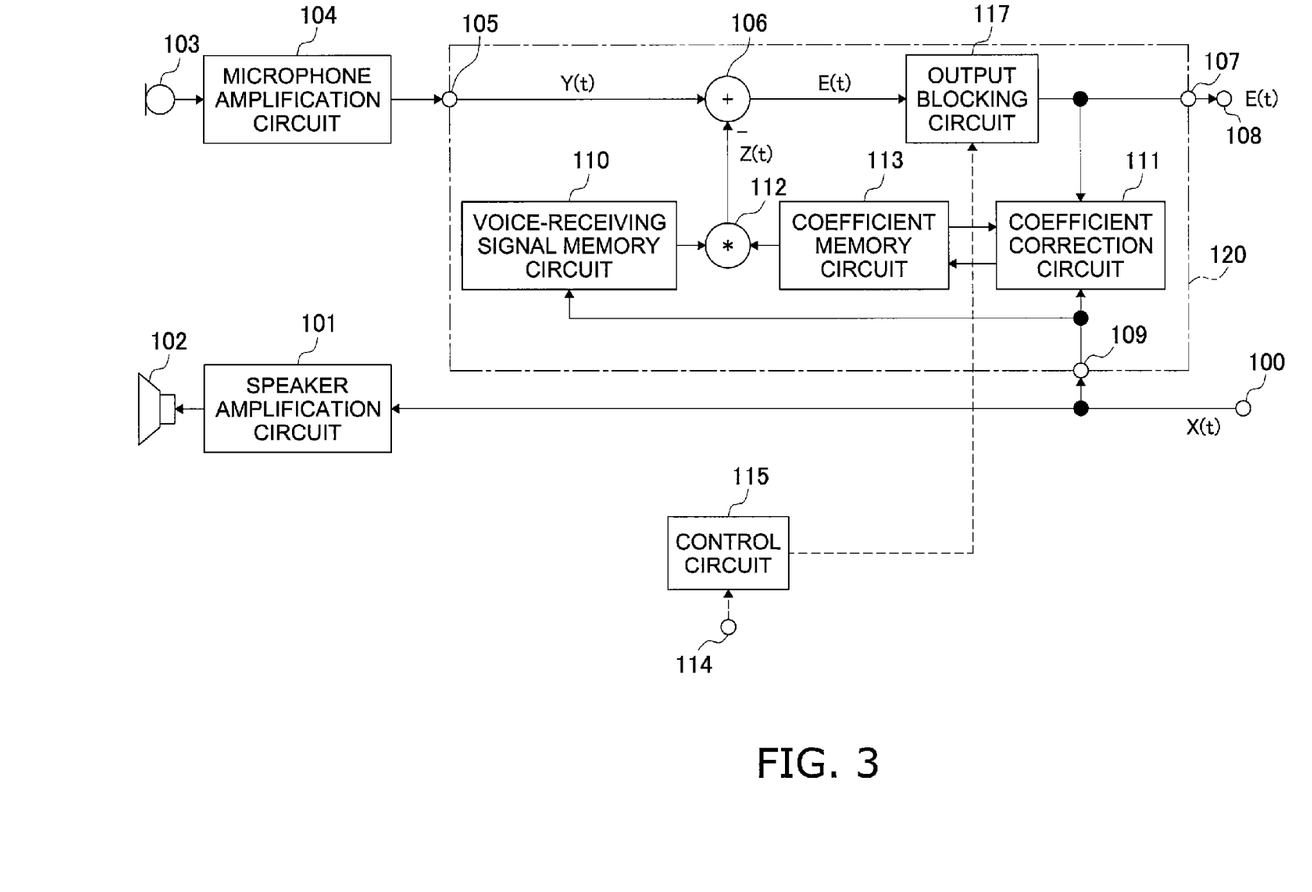
FIG. 3 is a block diagram of the input/output apparatus according to a third embodiment.

FIG. 3 is a block diagram of the input/output apparatus 1 according to a third embodiment. The difference between the first embodiment and the third embodiment is that the adaptive filter circuit 120 comprises an output blocking circuit 117 subsequent to the subtraction circuit 106. This difference will be mainly described below. In the present embodiment, a scene is envisioned in which the microphone 103 is muted.

The output blocking circuit 117 is disposed between the subtraction circuit 106, and the voice-transmitting signal output terminal 107 and the coefficient correction circuit 111. The output blocking circuit 117 stops output of a signal inputted from the subtraction circuit 106 in cases in which a stop signal has been inputted from the control circuit 115. Output of the residual signal E(t) to the coefficient correction circuit 111 and the voice-transmitting signal output terminal 107 is thereby stopped while the microphone 103 is muted.

The control circuit 115 outputs to the output blocking circuit 117 a control signal for stopping output from the output blocking circuit 117 in cases in which the microphone mute signal has been inputted from the mute signal input part 114. The signal outputted from the subtraction circuit 106 is thereby blocked by the output blocking circuit 117.

In the present embodiment, the control circuit 115 does not stop the process of the microphone amplification circuit 104, the product-summing circuit 112, and the subtraction circuit 106, and the residual signal E(t) is therefore outputted to the output blocking circuit 117 from the subtraction circuit 106.

In the present embodiment, the control circuit 115 does not stop the process of the coefficient correction circuit 111, but output from the output blocking circuit 117 is entirely stopped, and the coefficient correction circuit 111 does not therefore compute the update value of the transfer coefficient. As a result, the transfer coefficient stored in the coefficient memory circuit 113 is held while the microphone 103 is muted.

(Operation and Effect)

In the input/output apparatus 1 according to the third embodiment, the adaptive filter circuit 120 stops output of the residual signal E(t) produced based on the pseudo echo signal Z(t) and the voice-transmitting signal Y(t) in cases in which the microphone 103 is muted. Specifically, the control circuit 115 allows the signal outputted from the subtraction circuit 106 to be blocked by the output blocking circuit 117 in cases in which the microphone mute signal has been inputted from the mute signal input part 114.

Accordingly, output of the residual signal E(t) can be suppressed despite the fact that the microphone 103 is muted, and the occurrence of an echo and/or howling can therefore be suppressed in the same manner as in the first embodiment.

In addition, output of the residual signal E(t) to the coefficient correction circuit 111 is blocked, and updating of the transfer coefficient is therefore stopped while the microphone 103 is muted. Accordingly, an echo and/or howling can be quickly suppressed after cancellation of muting.

4. Fourth Embodiment (Configuration Of Input/Output Apparatus 1)

Figure 4:
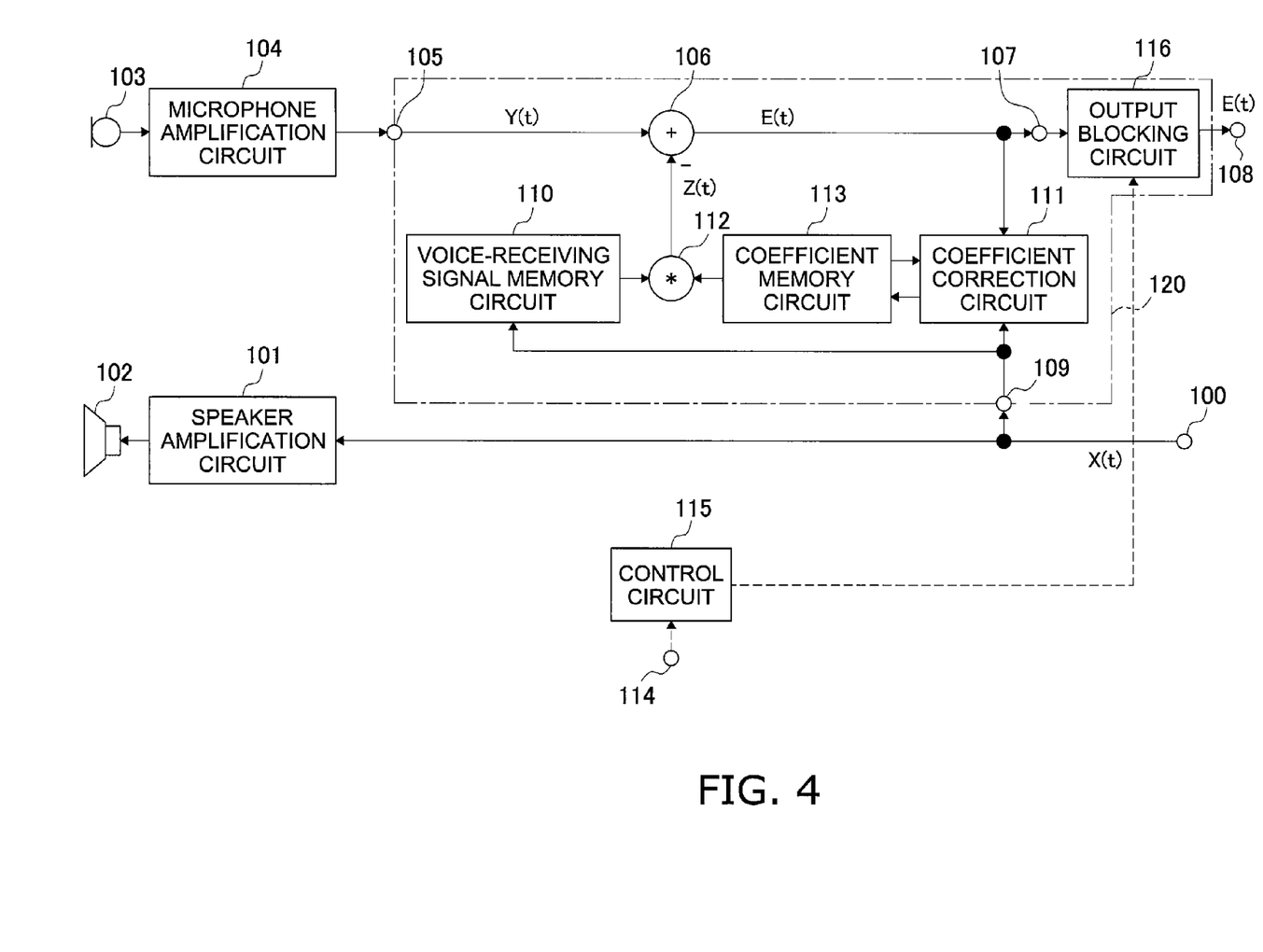
FIG. 4 is a block diagram of the input/output apparatus according to a fourth embodiment.

FIG. 4 is a block diagram of the input/output apparatus 1 according to a fourth embodiment. The difference between the third embodiment and the fourth embodiment is that the adaptive filter circuit 120 comprises an output blocking circuit 116 subsequent to the voice-transmitting signal output terminal 107. This difference will be mainly described below. In the present embodiment, a scene is envisioned in which the microphone 103 is muted.

The output blocking circuit 116 is disposed between the voice-transmitting signal output terminal 107 and the output terminal 108. The output blocking circuit 116 stops output of a signal inputted from the voice-transmitting output terminal 107 in cases in which a stop signal has been inputted from the control circuit 115. Output of the residual signal E(t) to the output terminal 108 is thereby stopped while the microphone 103 is muted.

The control circuit 115 outputs to the output blocking circuit 116 a control signal for stopping output from the output blocking circuit 116 in cases in which the microphone mute signal has been inputted from the mute signal input part 114. The signal outputted from the subtraction circuit 106 is thereby blocked by the output blocking circuit 116.

In the present embodiment, the control circuit 115 does not stop the processes of the microphone amplification circuit 104, the product-summing circuit 112, and the subtraction circuit 106. The residual signal E(t) is therefore outputted to the output blocking circuit 116 from the subtraction circuit 106.

In the present embodiment, a path to the coefficient correction circuit 111 from the subtraction circuit 106 is maintained, and the process of the coefficient correction circuit 111 is not stopped by the control circuit 115. The coefficient correction circuit 111 therefore continues to compute the update value of the transfer coefficient even while the microphone 103 is muted.

(Operation and Effect)

(1) In the input/output apparatus 1 according to the fourth embodiment, the adaptive filter circuit 120 stops output of the residual signal E(t) produced based on the pseudo echo signal Z(t) and the voice-transmitting signal Y(t) in cases in which the microphone 103 is muted. Specifically, the control circuit 115 uses the output blocking circuit 116 to block the signal outputted from the voice-transmitting signal output terminal 107 in cases in which the microphone mute signal is inputted from the mute signal input part 114.

Accordingly, output of the residual signal E(t) can be suppressed despite the fact that the microphone 103 is muted in the same manner as in the third embodiment, and the occurrence of an echo and/or howling can therefore be suppressed.

(2) In addition, output of the residual signal E(t) to the coefficient correction circuit 111 is not blocked, and the coefficient correction circuit 111 is therefore allowed to continue computing the update value of the transfer coefficient even while the microphone 103 is muted.

Accordingly, the learning function of the transfer coefficient can be allowed to continue even during muting. An echo and/or howling can therefore be quickly suppressed after cancellation of muting even in cases in which the positions (namely, the echo paths) of the speaker 102 and the microphone 103 are changed during muting.

5. Fifth Embodiment (Configuration Of Input/Output Apparatus 1)

Figure 5:
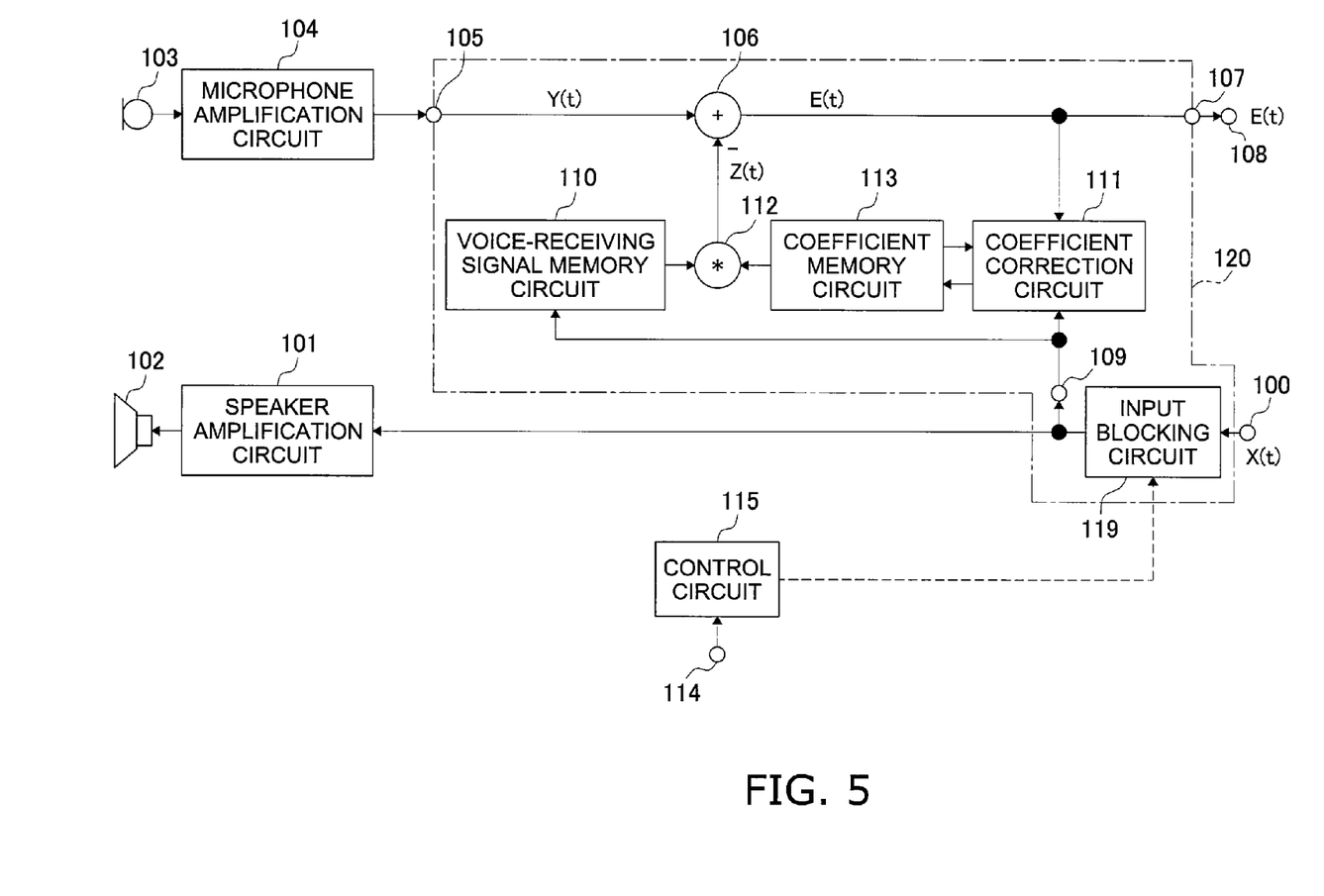
FIG. 5 is a block diagram of the input/output apparatus according to a fifth embodiment.

FIG. 5 is a block diagram of the input/output apparatus 1 according to a fifth embodiment. The difference between the first embodiment and the fifth embodiment is that the adaptive filter circuit 120 comprises an input blocking circuit 119 preceding the voice-receiving signal input terminal 109. This difference will be mainly described below. In the present embodiment, a scene is envisioned in which the speaker 102 is muted.

The input blocking circuit 119 is disposed between the input terminal 100 and the voice-receiving signal input terminal 109. The input blocking circuit 119 stops output of the voice-receiving signal X(t) inputted from the input terminal 100 in cases in which a stop signal has been inputted from the control circuit 115. Production of the pseudo echo signal Z(t) and the residual signal E(t) is thereby stopped while the speaker 102 is muted.

The control circuit 115 outputs to the input blocking circuit 119 a control signal for stopping output from the input blocking circuit 119 in cases in which the speaker mute signal has been inputted from the mute signal input part 114. The voice-receiving signal X(t) inputted from the input terminal 100 is thereby blocked by the input blocking circuit 119.

In the present embodiment, the control circuit 115 does not stop the processes of the microphone amplification circuit 104 and the subtraction circuit 106, but the product-summing circuit 112 ceases to function due to the blocking of input of the voice-receiving signal X(t) to the voice-receiving signal memory circuit 110. The voice-transmitting signal Y(t) is therefore output unchanged from the subtraction circuit 106 as the residual signal E(t).

In the present embodiment, the control circuit 115 does not stop the process of the coefficient correction circuit 111, but the coefficient correction circuit 111 ceases to function due to the blocking of input of the voice-receiving signal X(t) to the coefficient correction circuit 111. Updating of the transfer coefficient by the coefficient correction circuit 111 is therefore stopped. As a result, the transfer coefficient stored in the coefficient memory circuit 113 is held while the speaker 102 is muted.

(Operation and Effect)

In the input/output apparatus 1 according to the fifth embodiment, the adaptive filter circuit 120 stops output of the residual signal E(t) produced based on the pseudo echo signal Z(t) and the voice-transmitting signal Y(t) in cases in which the speaker 102 is muted. Specifically, the control circuit 115 causes the voice-receiving signal X(t) inputted from the input terminal 100 to be blocked by the input blocking circuit 119 in cases in which the speaker mute signal has been inputted from the mute signal input part 114.

Accordingly, output of the residual signal E(t) can be suppressed despite the fact that the speaker 102 is muted, in the same manner as in the first embodiment. The occurrence of an echo and/or howling can therefore be suppressed.

In addition, input of the voice-receiving signal X(t) to the coefficient correction circuit 111 is blocked, whereby the transfer coefficient stored in the coefficient memory circuit 113 can be held. Accordingly, an echo and/or howling can be quickly suppressed after cancellation of muting.

Other Embodiments

The present invention is described according to the aforementioned embodiments, but it should not be understood that the present invention is limited to the statements and drawings constituting a part of this disclosure. Various alternative embodiments, examples, and operational techniques are apparent from this disclosure to a person skilled in the art.

For example, in the present embodiment, the adaptive filter circuit 120 comprises the coefficient correction circuit 111, but no limitation is imposed thereby. The adaptive filter circuit 120 may not comprise the coefficient correction circuit 111, and the coefficient memory circuit 113 may save a fixed value as the transfer coefficient. Even in this case, the influence on sound quality is small in the case of an environment in which the change in audio transfer properties between the speaker 102 and the microphone 103 is small.

What is claimed is:

1. An input/output apparatus comprising:
   a speaker configured to output audio based on a voice-receiving signal;
   a microphone configured to produce a voice-transmitting signal based on gathered audio;
   a mute signal input portion configured to output at least one of a speaker mute signal for muting the speaker and a microphone mute signal for muting the microphone, the speaker mute signal and the microphone mute signal being produced via an operation of a user;
   an adaptive filter circuit configured to produce a pseudo echo signal and output a residual signal produced based on the pseudo echo signal and an amplified voice-transmitting signal, the pseudo echo signal being produced from the voice-receiving signal and a transfer coefficient which expresses audio transfer properties between the speaker and the microphone, the amplified voice-transmitting signal being produced by causing a microphone amplification circuit to amplify the voice-transmitting signal; and
   a control circuit configured to stop output of the residual signal from the adaptive filter circuit when the speaker is muted according to the speaker mute signal outputted from the mute signal input portion or when the microphone is muted according to the microphone mute signal outputted from the mute signal input portion.

2. The input/output apparatus of claim 1, wherein
   the adaptive filter circuit has a product-summing circuit and a subtraction circuit, the product-summing circuit configured to produce the pseudo echo signal by performing a convolution operation with the voice-receiving signal and the transfer coefficient, the subtraction circuit configured to compute the residual signal by subtracting the pseudo echo signal from the voice-transmitting signal; and
   the control circuit is configured to stop output of the residual signal from the adaptive filter circuit by stopping the convolution operation performed by the product-summing circuit.

3. The input/output apparatus of claim 1, wherein
   the adaptive filter circuit has a product-summing circuit and a subtraction circuit, the product-summing circuit configured to produce the pseudo echo signal by performing a convolution operation with the voice-receiving signal and the transfer coefficient, the subtraction circuit configured to compute the residual signal by subtracting the pseudo echo signal from the voice-transmitting signal; and
   the control circuit is configured to stop output of the residual signal from the adaptive filter circuit by stopping the subtraction performed by the subtraction circuit.

4. The input/output apparatus of claim 1, wherein
   the adaptive filter circuit has a product-summing circuit, a subtraction circuit and an output blocking circuit, the product-summing circuit configured to produce the pseudo echo signal by performing a convolution operation with the voice-receiving signal and the transfer coefficient, the subtraction circuit configured to compute the residual signal by subtracting the pseudo echo signal from the voice-transmitting signal, the output blocking circuit configured to block output from the subtraction circuit; and
   the control circuit is configured to stop output of the residual signal from the adaptive filter circuit by causing the output blocking circuit to block output from the subtraction circuit.

5. The input/output apparatus of claim 1, wherein
   the adaptive filter circuit has a product-summing circuit, a subtraction circuit and an input blocking circuit, the product-summing circuit configured to produce the pseudo echo signal by performing a convolution operation with the voice-receiving signal and the transfer coefficient, the subtraction circuit configured to compute the residual signal by subtracting the pseudo echo signal from the voice-transmitting signal, the input blocking circuit configured to block input of the voice-receiving signal to the adaptive filter circuit; and
   the control circuit is configured to stop output of the residual signal from the adaptive filter circuit by causing the input blocking circuit to block input of the voice-receiving signal to the adaptive filter circuit.

6. The input/output apparatus of claim 2, wherein
   the adaptive filter circuit has a coefficient correction circuit, the coefficient correction circuit configured to update the transfer coefficient based on the residual signal and the voice-receiving signal.

7. A communication terminal capable of bi-directionally exchanging audio signals with a counterpart terminal, the communication terminal comprising:
   a receiver configured to receive a voice-receiving signal from the counterpart terminal;
   the input/output apparatus of claim 1; and
   a transmitter configured to transmit the residual signal to the counterpart terminal.

* * * * *